Aug. 28, 1934.                G. WRIGHT                 1,971,550
                        INTERNAL COMBUSTION ENGINE
                        Filed Jan. 27, 1932        3 Sheets-Sheet 2
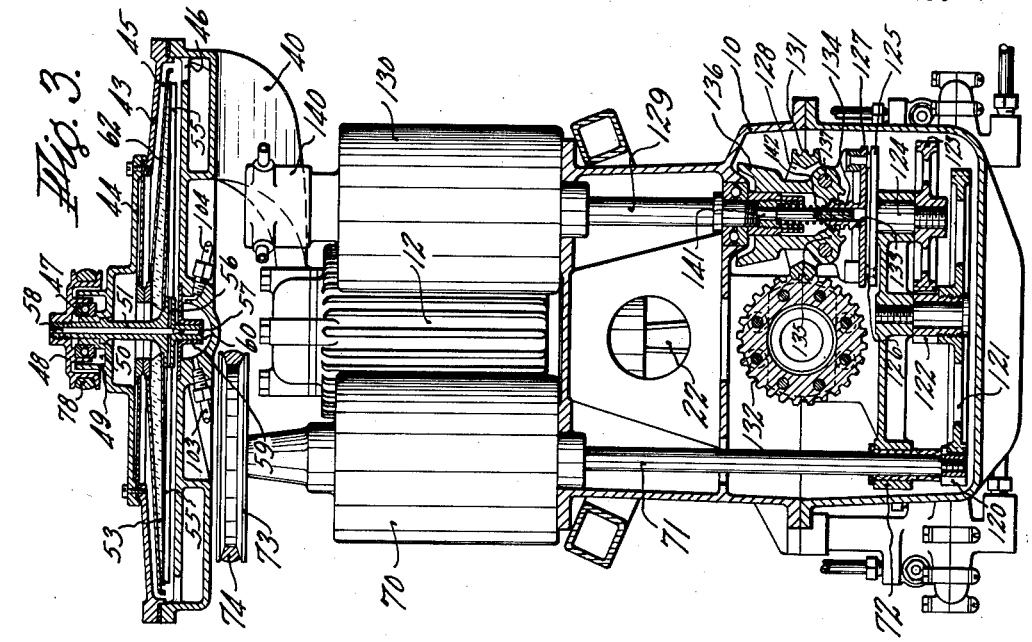
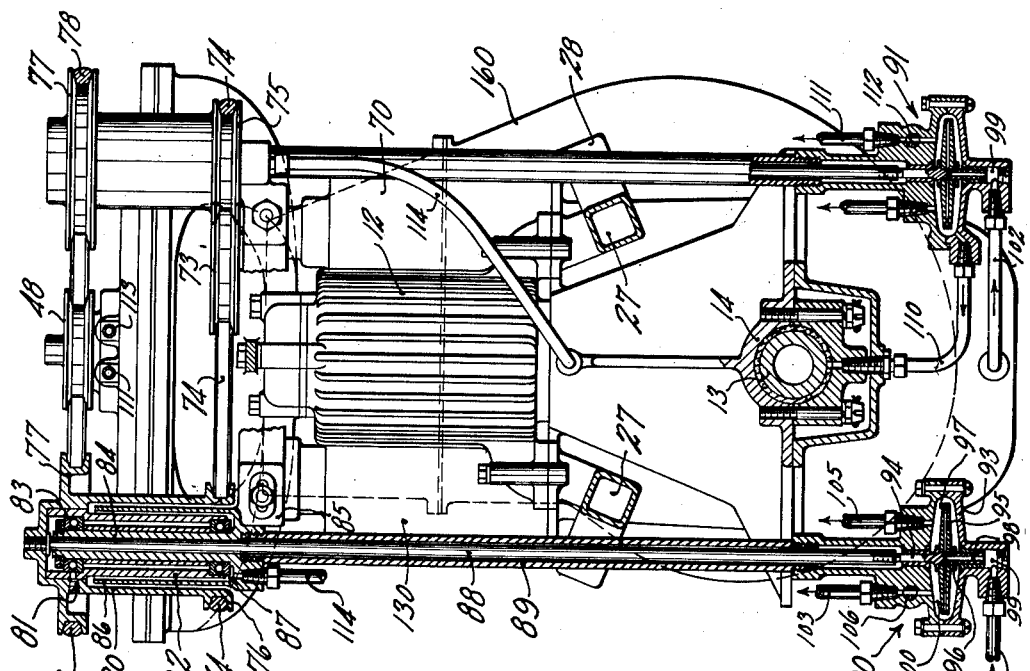
INVENTOR.
GILBERT WRIGHT
BY Chapin + Neal
ATTORNEYS.

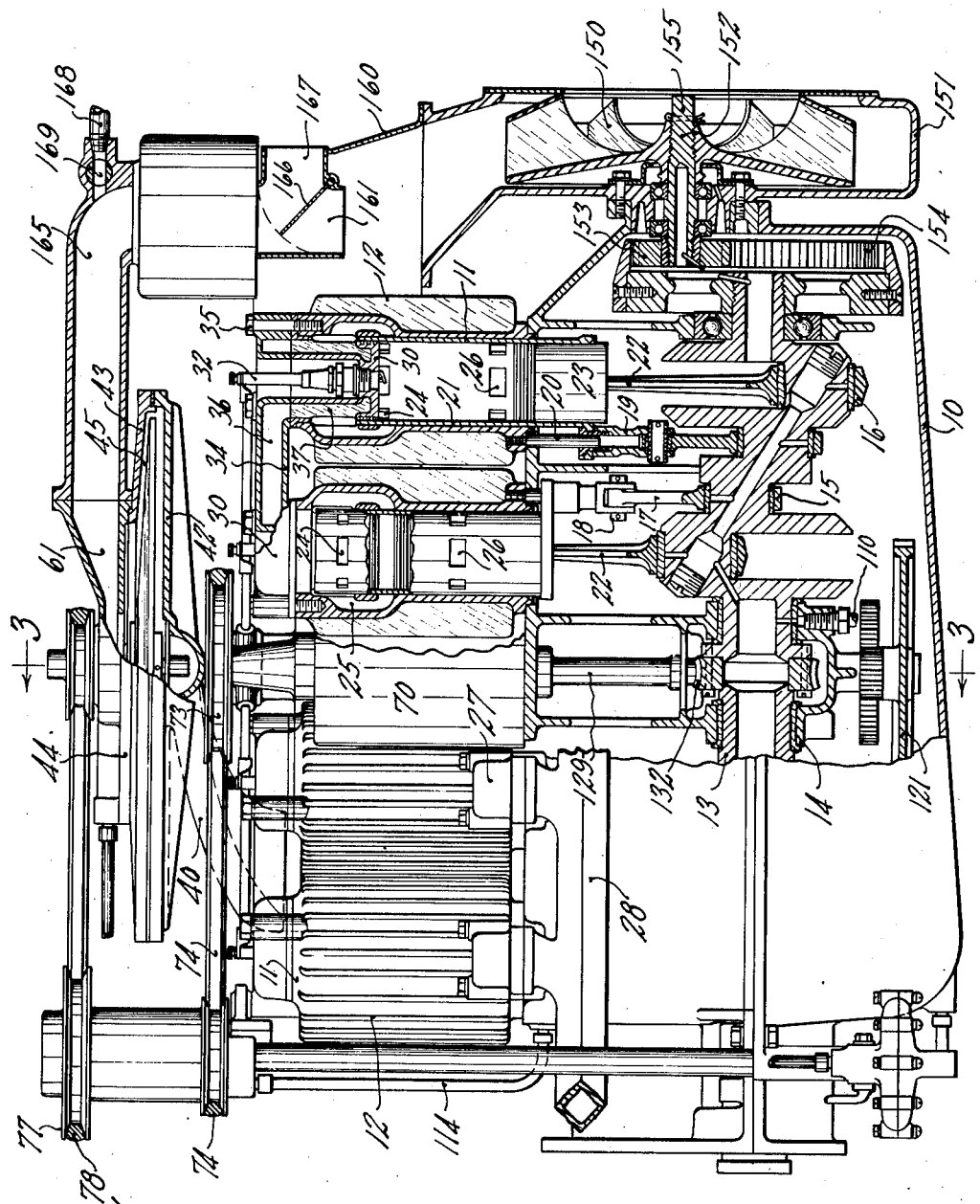

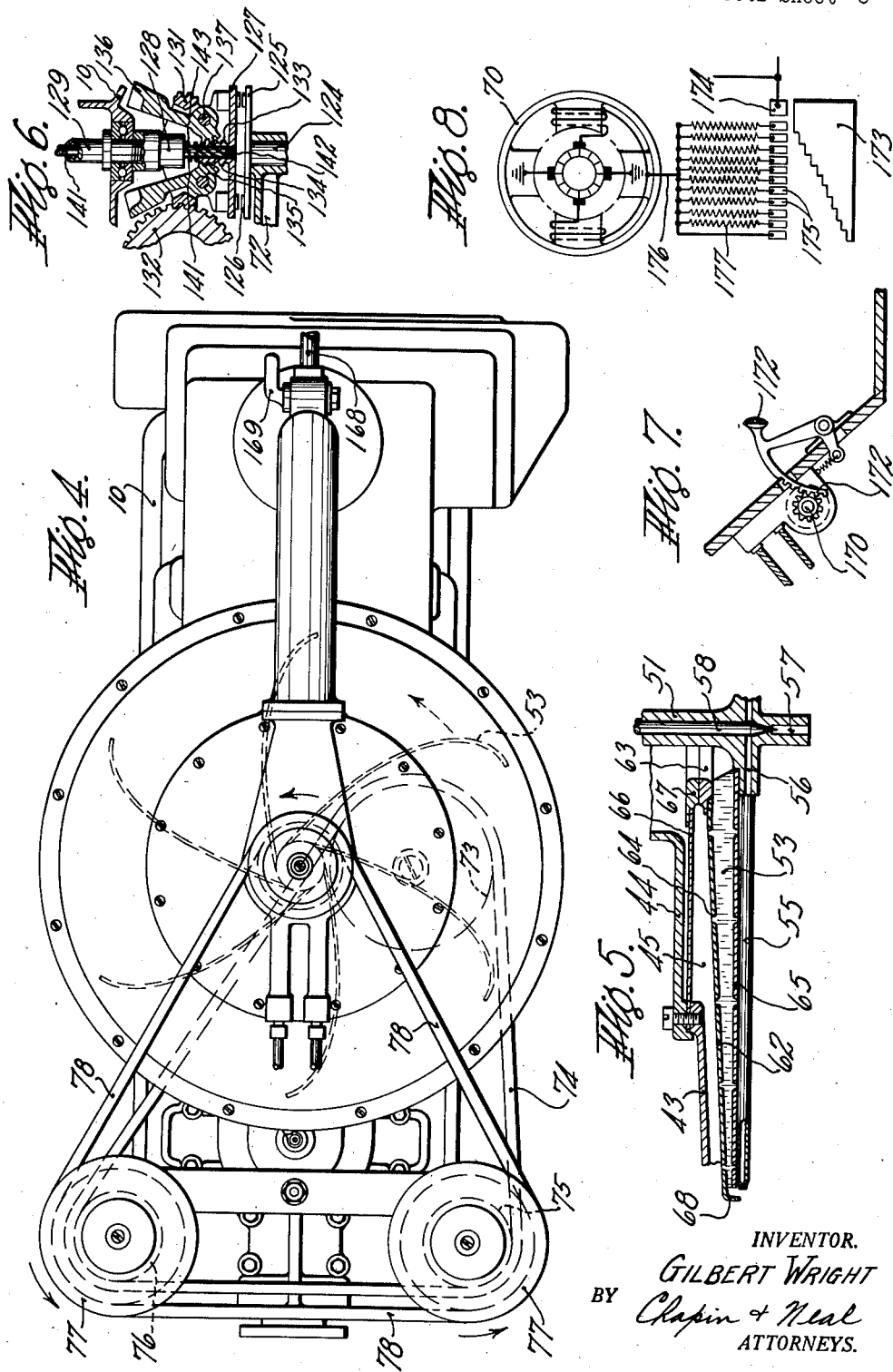

Patented Aug. 28, 1934

1,971,550

UNITED STATES PATENT OFFICE 1,971,550

INTERNAL COMBUSTION ENGINE

Gilbert Wright, Granville Center, Mass., assignor of one-half to Holland N. Stevenson, New Rochelle, N. Y.

Application January 27, 1932, Serial No. 589,073

6 Claims. (Cl. 123—195)

This invention relates to internal combustion engines, particularly those of the two-stroke cycle type, and is in certain aspects an improvement on the engine described in my prior application Serial No. 418,624, filed Jan. 4, 1930. Reference may be made to that case for a discussion of the theoretical principles upon which the engine operates. One object of the present invention is to provide an improved controlling device for engines of this type. A further object is to improve the fuel feeding and mixing devices. A further object is to provide a single control for starting the engine and for governing its operation. A further object is to improve the air circulating mechanism of air cooled engines. A further object is to improve the mounting and driving of the several fluid feeding mechanisms. Additional objects will appear from the following description and claims.

Referring to the drawings:

Fig. 1 is a side elevation, partly broken away, of an internal combustion motor embodying my invention;

Fig. 2 is an end elevation, looking from the left in Fig. 1 and having some of the parts broken away;

Fig. 3 is a section on line 3—3 of Fig. 1;

Fig. 4 is a top plan of the mechanism shown in Fig. 1;

Fig. 5 is a detailed section, on an enlarged scale, through the fuel mixer and vaporizer;

Fig. 6 is a detail, similar to a portion of Fig. 3 but showing the parts in different positions;

Fig. 7 is a detail of the foot control; and

Fig. 8 is a diagram of the control device wiring.

The engine is mounted upon a crank case 10 upon which are a plurality of cylinders 11, four in number in the embodiment shown. Each cylinder is provided with external cooling flanges 12, the engine being preferably air cooled. A crank shaft 13 is journaled in bearings 14 and is formed with two sets of crank bearings 15 and 16. Upon the bearings 15 are mounted connecting rods 17 pivoted at 18 to slides 19 mounted upon stationary guide pins 20 and joined to valve sleeves 21. Upon the bearings 16 are mounted connecting rods 22 connected in the usual way to pistons 23 which reciprocate within the sleeves 21. Near the upper ends of each sleeve 21 is a circumferential series of ports 24 adapted to register with ports in the cylinder wall leading into an annular admission chamber 25. Ports 26 in a circumferential series lower down on the valve sleeves are adapted to register with corresponding ports in the cylinder wall opening into exhaust pipes 27 which merge into a manifold 28. Each cylinder is fitted with a cylinder head 30 extending well into the cylinder so as to furnish an internal bearing for the sleeve 21 and has a central opening for a spark plug 32. The cylinder heads are held in place by an intake manifold 34 secured to the cylinders by bolts 35. The hollow interior 36 of the intake manifold connects with the annular admission chambers 25 and, when the ports 24 are in register with their corresponding admission ports, connects with the combustion space at the tops of the cylinders. The cylinder heads are preferably provided with fins 37 which extend into the path of the gases flowing from the intake manifold to the chambers 25, both cooling the cylinder heads and heating the gases to assist in the vaporization of the fuel.

The intake manifold is joined by conduits 40, which may be formed integral therewith, with a support 42 carried by the manifold and spaced somewhat above it. Cover plates 43 and 44 are carried upon this support and are shaped to provide an enclosed shallow circular chamber 45 connected by ports 46 with the conduits 40. The plate 44 is formed with a mounting for a ball bearing 47 carrying a hub of a pulley 48, which preferably has a recess to receive an annular flange 49 on the frame, thereby producing an oil receiving reservoir 50. The hub of the pulley is joined to a spindle 51 extending into the chamber 45. Curved fan blades 53 (Fig. 4) are carried by this spindle, as are fuel jet tubes 55 which preferably extend radially nearly to the ends of the fan blades. The inner ends of the tubes are connected by holes 56 with an axial hole 57 in the spindle, this latter hole being capable of being partially closed to any extent desired by an adjustable needle valve 58. The lower end of the spindle 51 is received in a bearing 59 and dips into a fuel well 60.

As the spindle rotates, liquid fuel will be thrown outwardly through the jets 55, causing it to be sucked upwardly from the well 60. At the same time, air, which is led to the center of the fan by an inlet port 61 (Fig. 1) in the cover plate 44, is driven outwardly by the fan and is deflected across the ends of the fuel jets by a plate 62. This plate, as best shown in Fig. 5, is secured at its inner end to a ring 63, and has holes 64 in which lugs of the fan blades 53 are welded or otherwise secured. A second plate 65 is similarly secured to the fan blades, and is directly fastened to the spindle 51 in any desired way. A diaphragm 66 is secured between the cover plates 43 and 44, bearing a ring 67 contacting with the ring 63. This preserves a tight seal with a pressure inversely proportional to the pressure difference between the air intake and the chamber 45, since as the pressure difference increases the diaphragm 66 will be flexed and the pressure between 63 and 67 decreased. The end of the plate 62 is preferably bent at 68 so as to provide a baffle to deflect the air blown by the fan and cause it to pass across the end of the fuel tubes 55. The fuel and air are thoroughly mixed by this action and the mixture is forced through the chamber 41 and the intake manifold to the several cylinders.

At one side of the crank case a motor 70 is mounted. The lower end of the motor shaft 71 is journaled in a bearing 72 within the crank case while the upper end of the shaft bears a pulley 73. A belt 74 passes around this pulley and also around a pair of pulleys 75 and 76 mounted as will be described at opposite sides of the engine near one end thereof. These pulleys are double, having upper belt carrying portions 77 around which a second belt 78 passes, the latter belt also passing around the pulley 48 previously described. By this means the fuel vaporizing device is driven by the motor 70 at a speed determinable by that of the motor.

As set forth in my prior application referred to above, the centrifugal fuel vaporizer and pump is driven at a speed independent of that of the engine crankshaft. The timing of the sleeve valves is such that as a piston nears the bottom of its cylinder the exhaust ports open, and then after the pressure has substantially lowered, the inlet ports open. The inlet ports are arranged circumferentially around the top of the cylinder so that the fresh charge is introduced in stratified form with a minimum of turbulence. As the fresh charge enters the cylinder under the pressure given it by the vaporizer pump, it pushes the burned gas out the exhaust port. At the time the ports close the cylinder contains a volume of gas substantially constant under all conditions but made up of proportions of fresh and burned gas in stratified form depending upon the speed with which the vaporizer pump is driven. This speed depends upon the motor 70, which may be provided with any desired motor speed controlling device under the control of the operator. To cause the engine to deliver more power, the motor 70 is speeded up, whereby a larger proportion of fresh gas is delivered to the cylinders.

The double pulleys 75, 76 are identical in construction, and a description of the mounting of one only will be given. Referring to Fig. 2, it will be seen that the pulley 76 is mounted at the lower end of a sleeve 80, joined as by a set screw 81 to an inner sleeve 82. The latter sleeve rests at each end against ball bearings 83 carried by a tubular extension 84 of a bracket 85 supported on the manifold 34. A tubular extension 86 projects upwardly from the bracket 85 between the sleeves 80 and 82, so that an oil well 87 is provided. Oil is pumped to this reservoir by means to be described, providing constant lubrication for the bearings. A spindle 88 is screwed into the pulley 77, extending through the extension 84 and loosely through a tube 89 extending between the bracket 85 and the crank case.

The two spindles 88 drive a fuel pump 90 and an oil pump 91, respectively. The construction of these two pumps may be identical, and a description of one only will be given. In a bracket 93 secured to the crank case is journaled a spindle 94 to which a rotor 95 is held as by a collar 96. The rotor is provided with radial holes 97 connecting with an axial hole 98 formed in the lower portion of the spindle. This axial hole opens into a liquid well 99 formed in the lower portion of the bracket 93. A chamber 100 is formed in the pump casing, into which the liquid is delivered by centrifugal force through the radial holes 97. The well 99 of the pump 90 is connected by a pipe 101 to a suitable reservoir from which fuel is drawn, while the well 97 of the pump 91 is joined by a pipe 102 to the sump of the crankcase. A pipe 103 from the chamber 100 of the fuel pump leads to the fuel well 60 of the rotary mixer, from which a pipe 104 returns surplus fuel to the main reservoir. The pump 90 is driven in a fixed ratio to the motor 70 and hence in a fixed ratio to the rotary mixer which is also driven by the motor. The speed of the pump is therefore proportional to the amount of fuel consumed and not to the speed of the engine itself. Under heavy load conditions, where the crank shaft turns slowly but a relatively large amount of fuel is used, the mixer is being rotated at a speed higher in proportion to the crank shaft speed than when the engine is turning faster but under less load. The speed of the fuel pump is coordinated with the speed of the mixer during these varying conditions so that adequate supply of fuel to the well 60 is at all times assured. A pipe 105 is also taken from the chamber 100 and may lead to any suitable fuel pressure gauge. If desired, a regulating valve 106 may be placed in the pipe 103 so that the supply of fuel to the well 60 may be controlled.

From the oil pump 91 a series of pipes 110 may be taken to any desired number of lubricating points. One of these pipes is shown as leading to one of the bearings 14 where it delivers oil through the bearing to the hollow crank shaft, being distributed from there to the various connecting rod bearings. Another pipe 111, preferably provided with a control valve 112, leads to the oil well 50 in the mixer, a return pipe 113 from the well going to the crank case. Oil is supplied to the well 87 at the top of the oil pump shaft, and liquid fuel to the well 87 of the fuel pump shaft, through the clearance that exists between the shafts 88 and their bearings. The oil or fuel serves to lubricate the upper bearings.

The motor shaft 71 bears at its lower end a pinion 120 meshing with a gear 121 journaled within the crank case on a stud shaft on the bearing bracket 72. A pinion 122 formed on the hub of the gear meshes with a gear 123 threaded onto the end of a short shaft 124 likewise journaled in the bracket. Above the bracket the shaft 124 bears a clutch member 125 (Figs. 3 and 6), having on its upper surface clutch dogs 126. A cooperating clutch member 127 is vertically slidable on a member 128 threaded or otherwise secured to the lower end of the shaft 129 of a generator 130. A spiral gear 131 on the member 128 meshes with a similar gear 132 on the crank shaft, the tooth angle of the gears being preferably 45° so that the member can either drive the crank shaft or be driven by it. The clutch member 127 is provided with a hub portion 133 having teeth 134 meshing with the teeth of segments 135 formed at one end of weighted levers 136 pivoted at 137 to the member 128.

When the engine is at rest the parts just discussed are in the positions shown in Fig. 3, with the levers 136 drawn inwardly by the weight of the clutch member 127, and this latter member in operative connection with the lower clutch member 125. When current is applied to the motor 70 to start the mixer and the pumps, power is transmitted through the gearing described and the clutch to the spiral gearing 131, 132, thereby rotating the crank shaft and starting the engine. When the engine picks up on its own power, its speed increases, and the weighted levers are thrown out under centrifugal force, raising the upper clutch member and freeing the crank shaft from any connection with the motor 70. Thereafter during the running of the engine the motor 70 may be varied in speed as desired to control the mixer without relation to the speed of the crank shaft. As soon as the engine stops, however, direct connection between the motor 70 and the crankshaft is immediately and automatically reestablished ready for the next starting operation. This construction permits the use of a single motor for driving the mixer at a variable controlled speed and for starting the engine, and eliminates the necessity of any separate starting control. It will be noted that the gearing 120, 121, 122, 123 is speed reducing, so that the relatively small motor 70 can exert a large starting torque on the engine.

The weighted levers 136 are also utilized to control automatically the timing of the usual ignition distributor, shown conventionally in Fig. 3 at 140. The shaft 141 of the distributor passes through an axial hole in the generator shaft 129, and has at its lower end an enlarged portion 141 formed with screw threads 142 of long pitch threaded into similar internal threads within the hub portion of the upper clutch member. The distributor shaft thus turns with the generator shaft, but varies in its angular relationship to it depending upon the degree of elevation of the clutch member 127. This in turn varies in accordance with the degree to which the weighted levers 136 are thrown outwardly by the centrifugal force due to their rotation. The effect of this action is to advance the distributor in proportion to the speed of the engine, the mechanism for accomplishing this acting also to connect the engine with the starting motor when the engine stops. A spring 143 may serve to give additional resistance to the outward movement of the arms 136 if desired. If this spring is used it is preferably shorter than the distance between hub 133 and member 128, so that it will not interfere with the throwing out of the clutch 125, 127.

As stated previously, the engine is preferably of the air cooled type. A fan 150 is fixed within a casing 151 upon a shaft 152 suitably journaled in the crank case wall. The inner end of this shaft carries a pinion 153 which meshes with an internal gear 154 mounted upon the end of the crank shaft. This construction not only speeds up the fan relatively to the engine speed, but elevates the fan so that a larger fan can be used without decreasing the road clearance of the engine when utilized in an automobile. By fitting the end 155 of the starting crank for cooperation with the socket of a hand starting crank, advantage of a gear reduction will be obtained, making the engine easier to start by hand.

The casing 151 connects with a sheet metal conduit 160 extending across the upper ends of the cylinders. This casing has been omitted from Fig. 3 and from most of Fig. 1 to disclose parts contained within it, but appears in Fig. 2. The casing is preferably flaring towards the front when viewed in plan, so as to provide for the quantity of air transmitted through it falling off as successive cylinders are passed. Air is driven by the blower through the conduit and passes down the cylinder walls between the flanges 12. Cooling of the cylinder heads is also assisted by the incoming gas charge passing through the annular chambers 25 as previously described.

A pipe 165 connects the conduit 160 with the air inlet port 61 of the centrifugal mixer. A valve 166 is positioned in the pipe 165 so that its opening into the conduit 160 may be more or less shut off as desired, and an opening 167 from the pipe into the atmosphere is positioned with relation to the valve so that as connection to the conduit is cut off the opening to the atmosphere is increased, and vice versa. By admitting air from the conduit, the pressure of the air in the port 61 will vary with the speed of the motor, the valve 166 being adjusted so that the desired balance is obtained. In two-cycle engines it is frequently desirable to admit oil into the cylinder intake, and for this purpose a pipe 168 may be led from the crank case to the pipe 161. Under the control of a valve 169 the desired quantity of vaporized air from the crank case may thus be introduced into the cylinders.

In Figs. 7 and 8 one form of control for the motor 70 is shown diagrammatically. A control shaft 170, actuated by a gear and segment connection 171 with a pedal 172, carries a cylindrical stepped contact member 173, shown in Fig. 8 with its surface developed into a plane. This member is adapted to make contact with a contact piece 174 coupled to the storage battery and successively with a series of contact pieces 175 each coupled to the motor lead 176 through a resistance 177. When contact is first made the only current that can flow is that which can pass through a single one of these resistances. As rotation of the contact member progresses additional paths are opened for the current, giving a step by step control of the current furnished the motor and hence its speed.

What I claim is:

1. An internal combustion engine comprising cylinder and piston mechanism, a device for delivering a combustible gas mixture to the cylinders, an electric motor connected to said device to operate it at a rate independent of the engine speed, means connecting said motor with the engine when the engine speed falls below a predetermined amount, and a single control for the motor to control the starting and subsequent operation of the engine.

2. An internal combustion engine comprising a series of vertical cylinders arranged in line, a centrifugal fuel mixing device rotating upon a vertical axis arranged substantially centrally with respect to the cylinders, an electric motor arranged with its axis vertical at one side of the cylinders, a centrifugal fuel pump arranged with its axis vertical and connected with the mixing device to supply fuel thereto, and means connecting the mixing device and the fuel pump with the electric motor for rotation by it.

3. An internal combustion engine comprising a series of vertical cylinders arranged in line, a centrifugal fuel mixing device rotating upon a vertical axis arranged substantially centrally with respect to the cylinders, an electric motor arranged with its axis vertical at one side of the cylinders, a centrifugal fuel pump arranged with its axis vertical and connected with the mixing device to supply fuel thereto, a centrifugal oil pump arranged with its axis vertical, and a belt connection joining the mixing device, the fuel pump, and the oil pump with the electric motor for operation by it.

4. An internal combustion engine comprising cylinder and piston mechanism, a crank shaft, a power driven fuel vaporizing device, an electric motor connected to said vaporizing device for operating it, gearing connecting the electric motor to the crank shaft, and a speed responsive automatic clutch disconnecting the electric motor from the crank shaft when the crank shaft speed exceeds a predetermined amount.

5. An internal combustion engine comprising cylinder and piston mechanism, a crank shaft, a power driven fuel vaporizing device, an electric motor connected to said vaporizing device for operating it, a clutch adapted to connect the electric motor to the crank shaft or to disconnect it therefrom, an ignition distributor driven from the crank shaft, and a single device responsive to the speed of the crank shaft for varying the timing of the distributor and for operating the clutch to connect the crank shaft to the electric motor when the engine stops.

6. An internal combustion engine comprising cylinder and piston mechanism, a fuel mixing and feeding device operable during normal running of the engine to deliver the fuel mixture to the cylinders under pressure conditions independent of the speed of the motor, a single motive power means coupled to said fuel mixing device, operable independently of the engine, an engine starting device, means operable to connect said motive power means with the engine starting device, and means for varying the speed of the motive power means independently of the speed of the motor to vary the pressure conditons under which the fuel mixture is delivered to the cylinders.

GILBERT WRIGHT.